W. C. RICE.
CASTER.
APPLICATION FILED DEC. 20, 1920.
1,373,352. Patented Mar. 29, 1921.
2 SHEETS—SHEET 2.
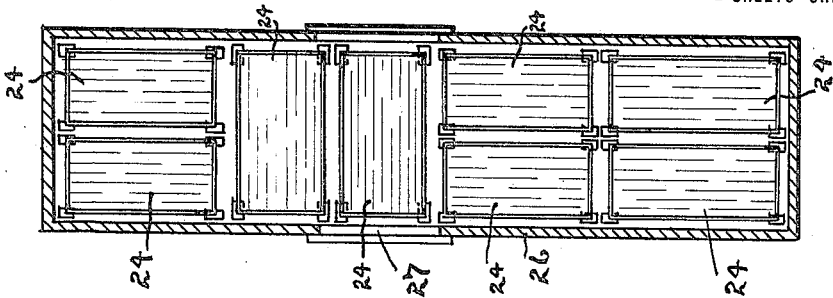
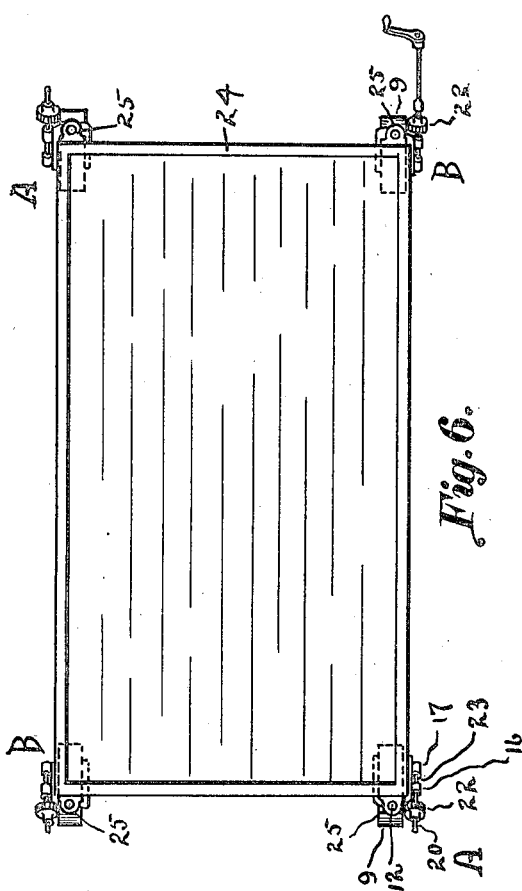
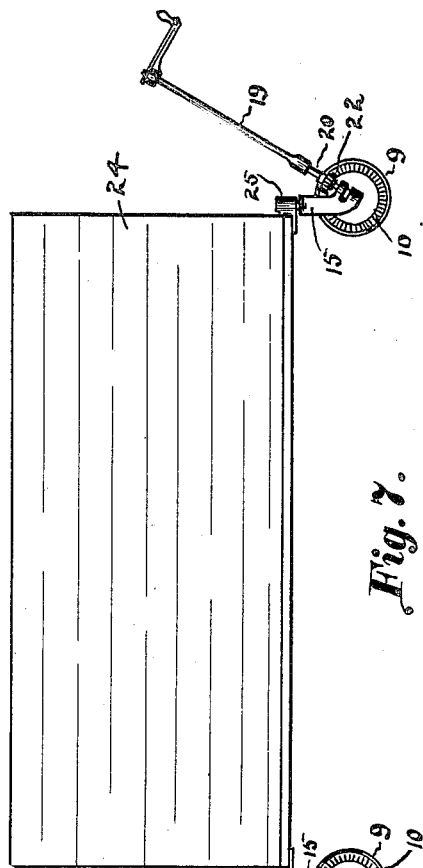
Inventor
W. C. RICE, ns,
UNITED STATES PATENT OFFICE.

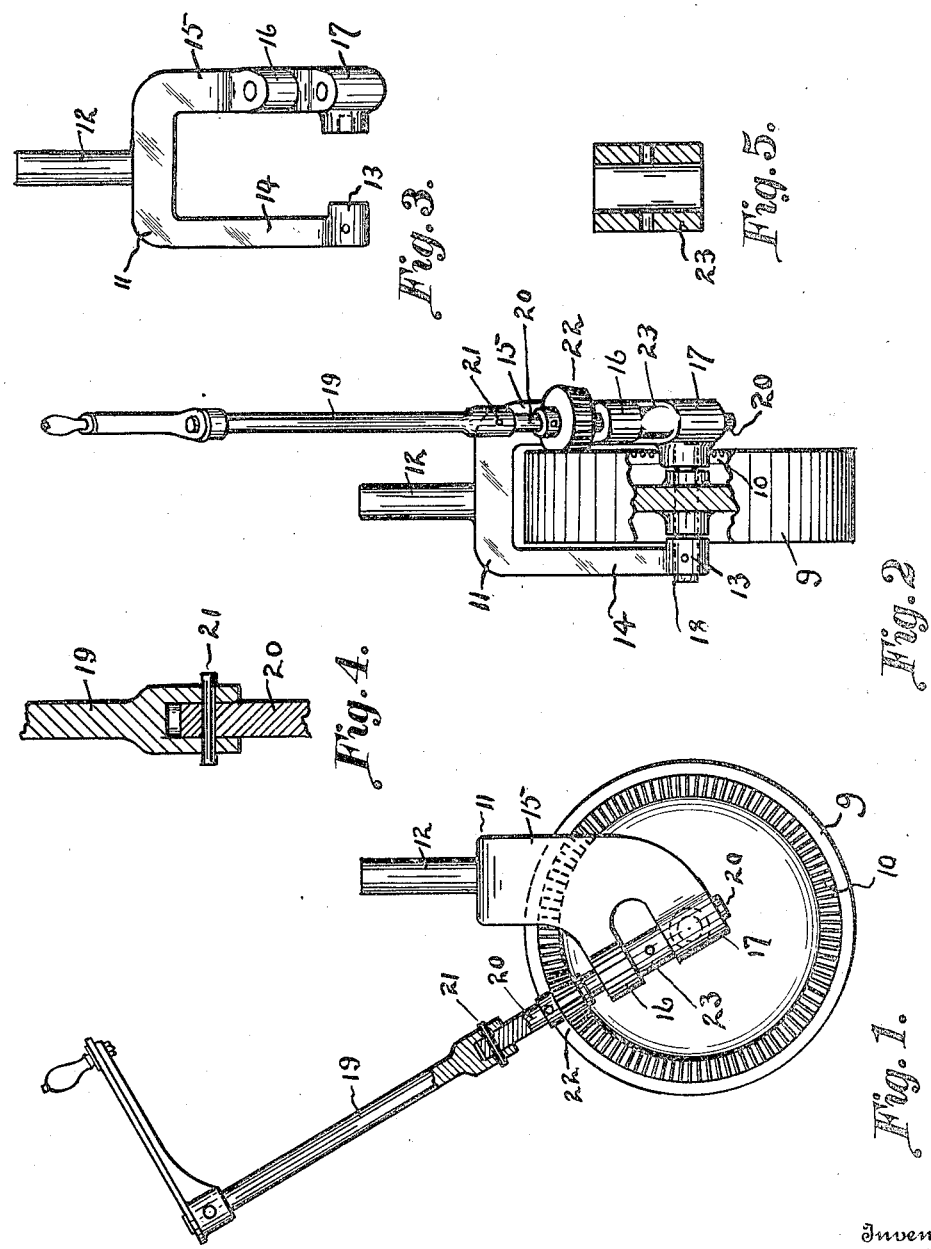

WALLACE C. RICE, OF OMAHA, NEBRASKA.

CASTER.

1,373,352.  Specification of Letters Patent.  Patented Mar. 29, 1921.

Application filed December 20, 1920. Serial No. 432,158.

*To all whom it may concern:*

Be it known that I, WALLACE C. RICE, a citizen of the United States, residing at Omaha, in the county of Douglas and State of Nebraska, have invented certain new and useful Improvements in Casters, of which the following is a specification.

This invention relates to an improvement in casters for use in connection with truck bodies and of particular advantage for controlling the movements of heavily loaded containers, and has for its objects to provide such a construction that coal, ore or other comparatively heavy material or merchandise may be conveniently moved upwardly or downwardly upon steep inclines, said trucks being under control of an operator so that they may be readily deposited to utilize practically the entire floor space of freight cars for shipment, will be convenient for loading and unloading, and will operate to utilize the floor space of warehouses, as well as freight cars.

The novel and useful features of the invention are fully described herein and are illustrated in the drawings, wherein,—

Figure 1 is a view in side elevation, partly in section showing one of the casters of a pair. Fig. 2 is a partly broken front view of the same. Fig. 3 is a front view of a yoke. Fig. 4 is a sectional detail to clearly show the removable connection of a crank-arm with the actuating-shaft of the caster. Fig. 5 is a view in longitudinal section of a spacing-member. Fig. 6 is a plan view of a truck-body provided with the casters. Fig. 7 is a side view of the same. Fig. 8 is a sectional plan view of a box car, showing a plurality of the trucks deposited therein, to illustrate utility of the invention.

While the casters are employed in pairs for a control of the movements of rectangular containers, it is considered that a description of a single caster is sufficient. Each caster consists, in part, of a wheel 9 having one of it sides near its periphery provided with an annular rack or teeth 10. At 11 is indicated a yoke provided with a bearing-member or upwardly projecting spindle 12, one of the arms 14 of the yoke being provided at its end with an apertured boss 13, its opposite arm 15 being provided with an apertured boss 16 and with an L-shaped boss having apertures formed therein and disposed in spaced relation with reference to the boss 16; and, with bearings on a pin 18 which is disposed in the aperture of the boss 13 and in one of the apertures of the boss 17, the wheel 9 is axially mounted.

At 19 and 20 are respectively indicated a crank-arm and an actuating-shaft, these being disposed in alinement and being removably connected at their inner ends by a pin 21 or equivalent means, the shaft 20 being provided with a gear wheel 22, adapted to engage the annular rack or circularly arranged teeth 10, a spacing-member 23 which is secured to the shaft 20 and disposed between the bosses 16 and 17 operating to prevent any sliding movement of the shaft 20 and thereby operating to maintain the wheel 22 in engagement with the teeth 10.

Numerals 24 indicate containers or truck bodies, rectangular in plan, each having its bottom, at or near its corners, provided with bearing-members or sockets 25 for receiving the pintles or spindles 12 of the yokes 11; and it will be seen that the wheels 9 may be revolved readily by use of the crank-arms 19 when the latter are connected with the actuating-shafts 20, this feature being of great advantage in instances where the containers 24 are filled with grain, ore, coal or other heavy material, and by use of the crank-arms the containers may be moved over obstructions or upwardly upon inclines which are comparatively steep. Also it is obvious that, by use of the crank-arms the speed of the containers when moving downwardly upon inclines will be under convenient control. Also it will be seen that since the spindle 12 is disposed non-parallel with the actuating-shaft the position of the crank-arm will be outwardly divergent with reference to the spindle, the axis of the actuating-shaft being at all times in line with the centers of the apertures of the bosses 16 and 17, the normal position of the bearing-member or spindle 12 being vertical.

In the use of the casters for supporting and controlling the movements of rectangular containers, it will be understood that the casters of each pair are similar as compared with each other and are mounted upon a container, at the corners thereof, diagonally opposite to each other, as indicated at A in Fig. 6, the pair of casters B (Fig. 6) at the remaining corners of the container being similar in all respects to those particularly described except that their actuating-shafts are disposed upon the reverse side of the wheels to those mentioned.

Since the actuating shafts are disposed outwardly divergent to the spindles, the crank-arms may be conveniently rotated, and may project with an outward and upward inclination at the front or side of a container, and on this account the containers may be conveniently placed in a box car 26. After they have been moved lengthwise through a doorway 27 of the car they may be moved sidewise to the positions shown in Fig. 8 to utilize approximately all of the floor area of a car, the crank-arms 19 being removed.

It will be appreciated that a socket-member could be substituted for member 12 of the yoke; and operation would be practically the same if the container was provided with spindles, socket-members being provided for the yokes. While I have described construction in detail, I do not wish to be understood as limiting myself to exactness in this respect, and changes in form, size, proportion and minor details may be made as found to be of advantage, said changes to be determined by the scope of the invention as claimed.

I claim:

In a caster, the combination of a yoke having downwardly projecting arms and an upwardly projecting bearing-member, one of said arms being provided with a pair of bosses, a pivot-pin engaging in the arms of the yoke, a wheel axially mounted on the pivot-pin and having an annular rack, an actuating-shaft journaled in and disposed approximately in line with the apertures in the bosses of said yoke-arm and provided with a gear wheel, a crank-arm removably mounted on the actuating-shaft, a spacing-member between the bosses of said yoke-arm secured to the actuating-shaft for maintaining the gear wheel in engagement with the annular rack, the axes of the apertures in said bosses on said yoke-arm being disposed in non-parallelism with the axis of said bearing-member.

In testimony whereof, I have affixed my signature in presence of two witnesses.

WALLACE C. RICE.

Witnesses:
 HIRAM A. STURGES,
 ARTHUR H. STURGES.